Aug. 22, 1939.   H. F. BANHOLZER   2,170,442
TWITCH
Filed June 18, 1937
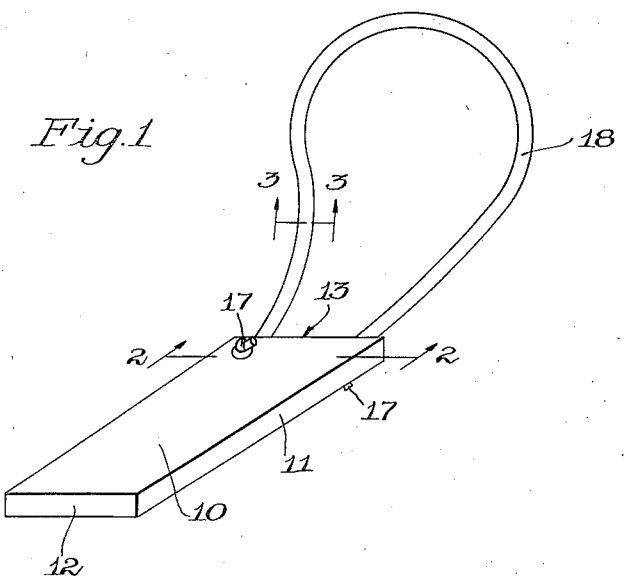
*Fig.1*
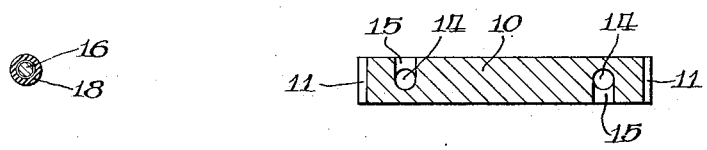
*Fig.3*   *Fig.2.*
Inventor
Harry F. Banholzer
By Charles S. Wilson
Att'y.

Patented Aug. 22, 1939

2,170,442

UNITED STATES PATENT OFFICE 2,170,442

TWITCH

Harry F. Banholzer, Chicago, Ill.

Application June 18, 1937, Serial No. 148,888

5 Claims. (Cl. 119—96)

This invention relates to twitches and has for its object a device of this character that will instantly free the horse's lip or nose when released, and will not be cruel or harsh in its application and use.

With the above and other objects in view, as will be apparent, the invention consists of the construction, combination and arrangement of parts all as hereinafter more fully described, claimed and illustrated in the accompanying drawing, wherein:

Figure 1 is a perspective view of a twitch constructed in accordance with the present invention;

Figure 2 is a sectional view taken on the line 2—2 of Fig. 1; and

Figure 3 is a sectional view taken on the line 3—3 of Figure 1.

Prior to the invention, twitches have been used on the upper lips or noses of nervous, unruly or fractious horses for the purpose of controlling them during harnessing, saddling, prior to the start of a race, etc. These prior twitches have been usually of make-shift construction, made without regard to either efficiency or consideration for the animals to which they are applied. They have generally consisted of a rope or a leather strap rebent to form a loop and having a handle secured to the end of the loop by which the sides of the loop may be twisted together with the upper lip or muzzle of the animal engaged in the bight of the loop.

It has been found that in such prior twitches the loop forms a very deep groove in the lip of the horse, from which it is not readily released and that the sides of the loop do not quickly and promptly unwind when the handle is released.

In starting races it is essential for a proper start to line the horses at the barrier or gate as evenly as possible. Where one or more of the horses in the race is nervous, fractious, or unruly, this becomes almost impossible unless some means is employed to temporarily control the nervous or fractious horse prior to the start. For this purpose the loop of a twitch is placed about the upper lip or muzzle of the horse and the handle is turned until the lip is firmly engaged and gripped by the loop. The horse can then be held comparatively quiet until the start is signalled when the handle is released.

The release of the handle of the twitch should permit it to rotate under the influence of the twisted sides of the loop in a reverse direction and instantly release the lip of the horse and drop to the ground where it may be recovered. In practice, however, it has been found that the twisted sides of the loop are slow in unwinding after the release of the handle, and this combined with the embedding of the bight of the loop in the lip or muzzle of the horse, frequently causes the twitch to remain on the nose of the animal for a considerable distance, sometimes throughout the entire race. This annoys the horse and interferes appreciably with this speed. Again it is customary for these prior twitches, instead of dropping to the ground immediately in front of the barrier or starting gate, as desired, to be dropped from the animal's nose, if at all, at almost any point along the track and not infrequently to be thrown completely off the track. This makes recovery difficult and the loss of twitches relatively high.

Furthermore the twitches heretofore used have had the loop so secured to the handle that the latter travels in a more or less horizontal plane and in a relatively large circle as the sides of the loop unwind, all to the annoyance of the horse and the interference with its speed.

The present invention contemplates overcoming all objections to the prior twitches and to that end proposes a construction whereby the sides of the loop quickly and easily unwind and release the animal's nose, the handle will rotate in a substantially vertical plane, the loop will be comparatively easy on the nose or lip of the horse, and the twitch will be as strong and durable, if not stronger and more durable, as those heretofore used.

Reference being had more particularly to the drawing 10 designates the handle of the twitch formed from any suitable material preferably wood. This handle 10 is generally rectangular in form and has its longitudinal sides 11 converging toward its outer end 12, so that the handle will more readily fit the hand.

At its inner or larger end, 13, the handle is provided with the parallel passages 14, which extend from the face of the inner extremity, 13, of the handle to points within the body, 10, of the handle, remote from the inner extremity, 13, thereof. Each passage, 14, at its inner extremity communicates with a transversely positioned opening, 15; the opening, 15, of one passage, 14, extending to and through one face of the handle, 10, while the opening, 15, of the other passage, 14, extends in the opposite direction to and through the opposite face of the handle, 10. These passages, 14, and openings, 15, are provided for so securing the loop to the handle, 10, that the latter will be evenly balanced, and will rotate without any substantial bodily movement in approximately a vertical plane, both in winding or unwinding the sides of the loop, as will be hereinafter more fully described.

The loop consists of a length of rope, 16, of any suitable material and size, which is bent upon itself to form an appropriate U. The extremities or end portions, 17, of the rope, 16, are each inserted in one of the passages, 14, of the handle, 10, and are drawn through the cooperating opening, 15, to be knotted, or otherwise secured against one face of the handle, 10, as illustrated in Figure 1. Thus each end, 17, of the length of rope, 16, is securely mounted in one of the passages, 14, of the handle in such manner that any pull on the rope, or the loop, will serve to tighten the knots in the extremities of the rope lying against the outer face of the handle, 10. This method of securing the rope, 16, to the handle, 10, so balances the handle that the torque which rotates the handle during the unwinding of the sides of the loop is applied equally to both faces of the handle and thereby prevents any substantial bodily movement thereof.

A rubber sheathing, or tubing, 18, is placed on the portion of the rope extending from the handle and forming the loop. The opening in the tubing, 18, which receives the rope, 16, is somewhat smaller in diameter than the diameter of the rope, whereby the tubing firmly and intimately engages said rope. The body of the tubing, 18, is sufficiently thick to perform its function of cushioning the rope and to cause the rapid unwinding of the same and its outer face is smooth, thereby providing a cushion between the animal's nose and the rope, 16, and eliminating any irregularities which might tend to irritate the skin of the lip.

In use the bight of the loop is placed over the horse's nose or upper lip, and the handle, 10, is rotated to wind the rubber covered sides of the loop one around the other, until the lip is firmly engaged. When the handle, 10, is released, the sides of the loop immediately unwind due to the action of the rubber covering and the twitch instantly drops from the animal's nose. This instantaneous unwinding of the sides of the loop upon the release of the handle, 10, causes the simultaneous freeing of the nose of the animal and the dropping of the twitch, thus preventing its continued engagement with the lip, interference with the movements of the horse, and the loss of the device.

Furthermore, by affixing the loop to the handle, 10, as above described, the handle will not, during the unwinding of the loop, swing bodily in all directions, but on the contrary will rotate in substantially a fixed plane. This will eliminate annoyance of the horse and interference with its movements.

What is claimed is:

1. In a twitch the combination with a wooden handle, rectangular in cross section and tapering toward one end and having a pair of parallel passages in one end thereof, communicating at their inner ends with openings extending in opposite directions, to and through opposite faces of the handle, of a length of rope rebent with its end portions passing through said passages and cooperating openings to be knotted against the outer opposed faces of the handle, and a rubber tube mounted on the exposed portion of the rope, and fitting tightly thereon.

2. In a twitch the combination with a wooden handle, rectangular in cross section, and tapering toward one end and having a pair of longitudinal parallel passages in the larger end thereof, communicating at their respective inner ends with transverse openings, extending in opposite directions to and through opposite faces of the handle, of a length of rope rebent with its end portions passing through said passages and their respective co-operating openings to be knotted against outer opposed faces of the handle, and a rubber tube mounted on the exposed portion of said rope, having a relatively thick wall, said tube fitting tightly on the rope.

3. A twitch comprising a handle, a rope loop secured at its ends to said handle, and a rubber tube mounted on the exposed portion of said loop, said tube fitting closely over the rope and being of sufficient thickness to prevent injury to the animal on which the twitch is used and to cause the loop to unwind quickly after being released from engaging position.

4. A twitch comprising an elongated handle, a loop formed of a flexible cord having its ends secured to one extremity of said handle, and an elastic, resilient tube encasing the exposed portion of said loop and fitting tightly over the same.

5. A twitch comprising a handle and a loop secured to the handle and projecting from one end thereof, said loop being formed of flexible cord having a yielding covering fitting closely over the same, said covering serving to prevent injury to the animal to which the twitch is applied, and also serving to unwind the twitch or return it quickly to normal position after having been applied.

HARRY F. BANHOLZER.